Dec. 21, 1926.
P. LA QUAGLIA
1,611,204
COMBINATION NOODLE AND CAKE CUTTER
Filed April 21, 1926
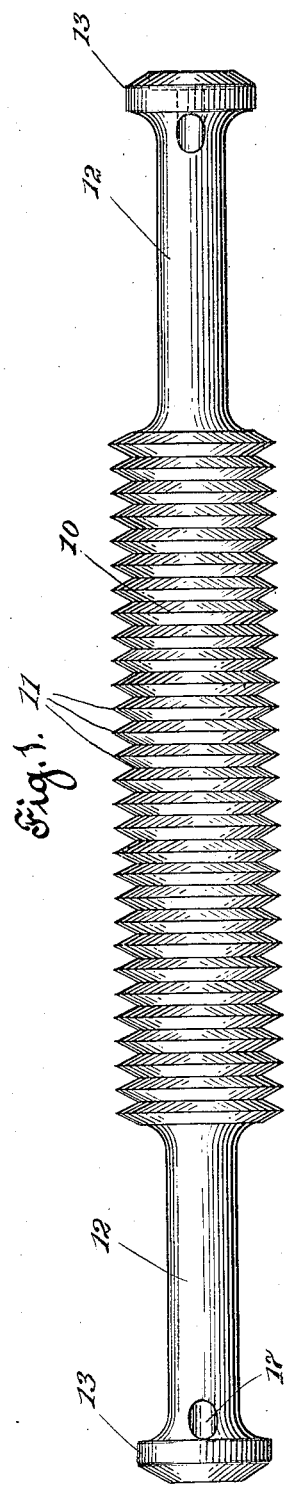
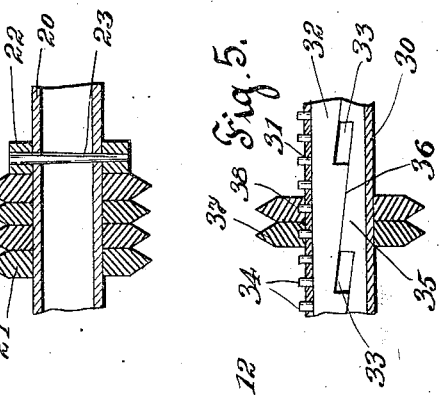
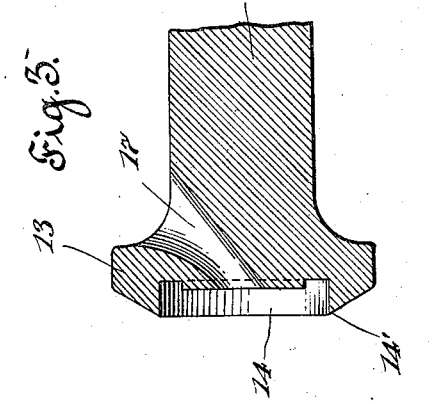
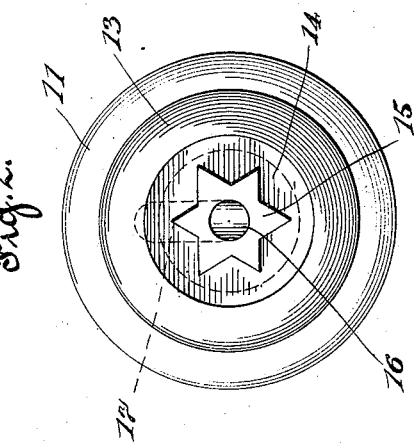
INVENTOR
Phillomeno La Quaglia
BY
Charles L. Wright
ATTORNEY Patented Dec. 21, 1926.

1,611,204

UNITED STATES PATENT OFFICE.

PHILLOMENO LA QUAGLIA, OF NEWARK, NEW JERSEY.

COMBINATION NOODLE AND CAKE CUTTER.

Application filed April 21, 1926. Serial No. 103,413.

This invention relates to combination noodle and cake cutters, and has as one of its objects to provide a device capable of cutting dough or other similar material into strips.

Another object is in the provision of means whereby designs may be impressed on unbaked pastry, making the same ornamental and attractive to the eye as well as the appetite.

A further object is to provide a device having means to lock the cutters in position and so avoid loss of time by slipping and side-play.

A still further feature is in the provision of means whereby the stamping device may be easily and quickly cleaned.

These and other objects, which will become apparent as the description progresses, are accomplished by the novel construction, combination and arrangement of parts hereinafter described and illustrated in the accompanying drawing, forming a material part of this disclosure, and in which:—

Figure 1 is a plan view of the preferred form of the invention.

Figure 2 is an enlarged end view thereof.

Figure 3 is a fragmentary longitudinal sectional view showing the stamp cleaning means.

Figure 4 is a similar view disclosing a modification of the invention.

Figure 5 is a like illustration showing a still further form of the disclosure.

The numeral 10 generally designates the main body portion of the cutter, made preferably out of maple wood, having on its outer periphery extending for a considerable length a plurality of sharply bevelled annular cutters 11.

Extending from both ends of the body 10, for a suitable length and integral therewith, are reduced handle elements 12 having enlarged ends 13 to afford an effective grip and prevent slipping of an operator's hands.

The end surface of the member 13 is drilled out to form a circular chamber 14 on the bottom wall of which may be secured any desired design, such as a star 15 having an opening 16 in the center thereof, the edges of the chamber being sharply bevelled as at 14' to present cutting edges.

Formed in the handles 12, adjacent the members 13, are angular recesses 17 connecting with the openings 16 in the design.

In the modification shown in Figure 4, a hollow tube 20 is employed in place of the solid bar used in Figure 1, having ends similar to the elements 13 (not shown).

Mounted on the tube 20 is a plurality of sharply bevelled washers 21 of equal size and made of celluloid, indurated fibre or other material not affected by moisture.

The washers are held in a rigid position by a collar 22 on each end thereof, the same being held firmly by a pin 23 passing therethrough and also through openings in the tube 20.

A further modification consists of a hollow tube 30 having a plurality of uniformly spaced openings 31 extending in a straight line for a distance equal to the limits of the serrations 11, there being also handles similar to 12 of Figure 1.

Mounted within the tube 30 is a block 32 having wedge-shaped faces 33, on the flat side of which is a plurality of small pins 34 uniformly spaced equal to the openings 31 in the tube 30.

Engaging with the wedge faces 33 of the block 32 is a similar block 35 having like faces 36 of wedge shaped formation.

The cutters 37, similar to 21, have in their inner periphery openings 38 to engage the pins 34 and thus remain in a rigid position.

From the foregoing it may be seen that in cutting noodles or pastry dough, the device is merely loosely grasped at the handles 12 and rolled over the material to be cut.

The device may also be used to stamp a design on the material by using the ends 13 in an obvious manner.

If it becomes necessary to clean the design, a finger may be inserted in the recess 17 reaching through the openings 16 in the design 15.

In the modification shown in Figure 5 the washers 37 are removed by moving the block 35 to the left thereby lowering the pins 34 out of engagement with the openings 38 in the washers; the opposite process is employed in replacing the washers.

While certain preferred embodiments of this device have been shown and described, it will be understood that changes in the form, arrangements, proportions, sizes and details thereof may be made without departing from the scope of the invention as defined in the appended claims.

Having thus described my invention, what

I claim as new and desire to secure by Letters Patent, is:—

1. A pastry cutter comprising a hollow roll, a plurality of cutter discs juxtaposed on said roll, and means operable within said roll for locking the discs thereon.

2. A pastry cutter comprising a tube having a longitudinal row of equally spaced openings, a plurality of cutters having double bevelled peripheries mounted on said tube in juxtaposed relation, said cutters having central radial openings in their bores, and means operable from within said tube passing through the openings therein to engage in the openings of said cutters to lock them to the tube.

Signed at New York, in the county of New York, and State of New York, this 14th day of April A. D. 1926.

PHILLOMENO LA QUAGLIA.